(No Model.)
G. L. RANDS.
STAND FOR POISON BOTTLES.
No. 478,818. Patented July 12, 1892.
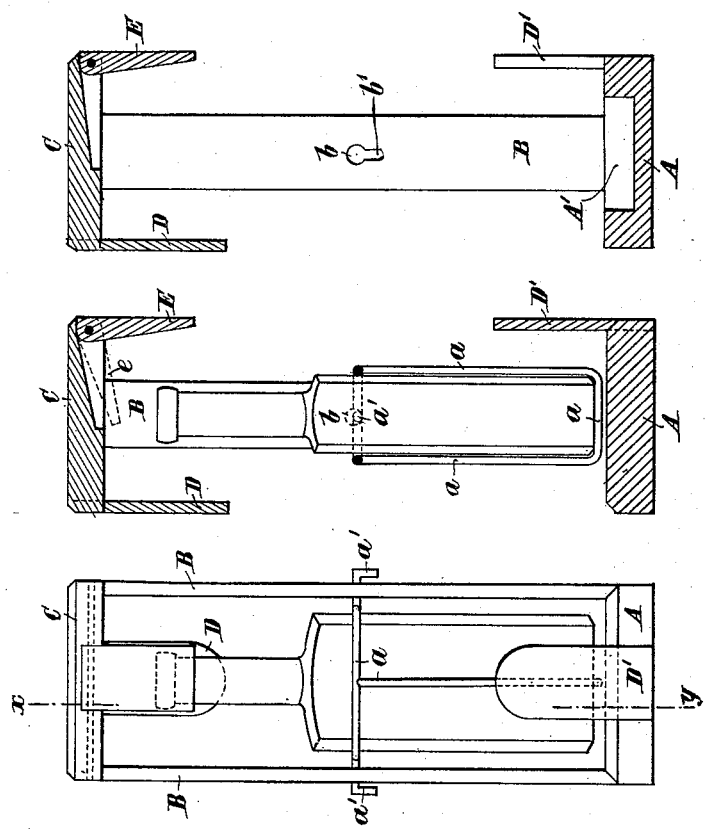
Witnesses:
E. B. Bolton
H. H. Palmer
Inventor:
George Lester Rands
By Richards
his Attorneys

UNITED STATES PATENT OFFICE.

GEORGE LESTER RANDS, OF LONDON, ENGLAND.

STAND FOR POISON-BOTTLES.

SPECIFICATION forming part of Letters Patent No. 478,818, dated July 12, 1892.

Application filed March 2, 1892. Serial No. 423,552. (No model.) Patented in England October 26, 1891, No. 18,406.

*To all whom it may concern:*

Be it known that I, GEORGE LESTER RANDS, commercial traveler, of 26 Trinity Street, London, county of Surrey, England, have invented an Improved Stand for Holding Bottles Containing Poison; and I do hereby declare that the following is a full, clear, and exact description thereof.

This invention has been patented to me in Great Britain October 26, 1891, No. 18,406.

This my invention relates to an improved stand or frame for holding a bottle containing poison; and its object is to devise a frame or stand for the purpose mentioned in which the bottle containing poison may be placed when not in use and from which it cannot be readily removed without releasing a retaining device, as will be hereinafter described.

It frequently happens that a medicine bottle or vial containing poison is allowed to stand about in hospitals, dispensaries, nurseries, sick-rooms, and other places where liniments and disinfectants are in use, and such bottles are a source of danger if the contents be taken in error. Adhesive labels are apt to become detached or obliterated, thereby rendering it difficult to distinguish the contents of the bottle.

My improved stand is illustrated in the accompanying drawings, in which like letters indicate corresponding parts in all of the figures, and in which—

Figure 1 is a front view of the frame and bottle therein. Fig. 2 is a cross-section of the same, taken on the line $x\,y$ in Fig. 1. Fig. 3 is a modification of my invention.

The stand, which may be made of any suitable material, consists of a base A, vertical side posts B, and top C, being open at the back and front. The bottle is inserted in a cradle $a$, which may be made of twisted wire, metal, or other suitable material, the said cradle $a$ being provided with laterally-projecting trunnions or pivots $a'$. The said trunnions $a'$ are adapted to engage with apertures $b$, formed in the sides B of the frame. In an alternative form the upper part of said cradle may consist of an india-rubber or other band of flexible material attached to trunnions in the side posts. Stops D D' are affixed to the top and base of the stand, respectively, for the purpose of limiting the oscillations of the bottle. A soft cushion of india-rubber, felt, or other suitable material may be fitted to each stop to prevent injury to the bottle, if desired. The bottle and cradle $a$ oscillate around the trunnions $a'$ and are adapted to be swung so as to permit the bottle to be removed or the contents poured out of the same. A hinged stop E is suspended from the top of the frame and is arranged so as to prevent the neck of the bottle being swung outward in order to remove the bottle or its contents without first displacing the stop, as indicated by the dotted lines in Fig. 2. The said stop E, however, allows the bottle to swing inward without impediment.

In the modification illustrated in Fig. 3 the base A is formed with a recess A', in which the lower portion of the bottle drops, the trunnion-holes $b$ being formed with a vertical slot $b'$, so that the bottle may be raised when required, the bottle in its vertical position resting in the before-mentioned recess.

A bar and lock may be affixed to the frame as an additional security, if required.

Various other modifications may be made without departing from the spirit of my invention.

Having now particularly described and ascertained the nature of my said invention and in what manner the same is to be performed, I declare that what I claim is—

1. A stand for bottles, consisting of a base A, having a recess therein, vertical side posts having elongated bearing-slots, a swinging frame having its journals in said slots and supporting the bottle, the fixed stops limiting movement of the frame in one direction, and a pivoted stop E, having movement in one direction only, substantially as described.

2. In combination with a swinging frame, a supporting structure having a base and side posts, and a top with a fixed stop on one of the open sides and a pivoted stop on the opposite side, substantially as described.

3. In a stand for bottles, the combination, with the base, of the vertical side posts having apertures therein, the cradle having trunnions engaging in the apertures, the top opened at the front and back, the hinged stop E, suspended from the top of the frame, and the fixed stops on top and base of stand, substantially as set forth.

In testimony that I claim the foregoing I have hereunto set my hand this 30th day of January, 1892.

GEORGE LESTER RANDS.

Witnesses:
W. WILSON HORN,
EDMUND S. SNEWIN.